United States Patent
Atkins et al.

(10) Patent No.: US 12,170,815 B2
(45) Date of Patent: Dec. 17, 2024

(54) PRODUCING AND ADAPTING VIDEO IMAGES FOR PRESENTATION ON DISPLAYS WITH DIFFERENT ASPECT RATIOS

(71) Applicant: Dolby Laboratories Licensing Corporation, San Francisco, CA (US)

(72) Inventors: Robin Atkins, Vancouver (CA); Suzanne Farrell, Portola, CA (US); Per Jonas Andreas Klittmark, Mountain View, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 179 days.

(21) Appl. No.: 18/000,773

(22) PCT Filed: Jun. 9, 2021

(86) PCT No.: PCT/US2021/036698
§ 371 (c)(1),
(2) Date: Dec. 5, 2022

(87) PCT Pub. No.: WO2021/252697
PCT Pub. Date: Dec. 16, 2021

(65) Prior Publication Data
US 2023/0217067 A1    Jul. 6, 2023

Related U.S. Application Data

(60) Provisional application No. 63/068,201, filed on Aug. 20, 2020, provisional application No. 62/705,115, filed on Jun. 11, 2020.

(30) Foreign Application Priority Data

Jun. 11, 2020    (EP) .................................... 20179451

(51) Int. Cl.
*H04N 21/4402*    (2011.01)
*H04N 21/435*    (2011.01)
(Continued)

(52) U.S. Cl.
CPC ... *H04N 21/440272* (2013.01); *H04N 21/435* (2013.01); *H04N 21/44218* (2013.01); *H04N 21/8146* (2013.01)

(58) Field of Classification Search
CPC ......... H04N 21/440272; H04N 21/435; H04N 21/4418; H04N 21/8146
See application file for complete search history.

(56) References Cited

U.S. PATENT DOCUMENTS

2002/0015098 A1    2/2002    Hijishiri
2013/0108168 A1    5/2013    Ptucha
(Continued)

FOREIGN PATENT DOCUMENTS

| EP | 3416381 A1 | 12/2018 |
| GB | 2467898 A | 8/2010 |
| WO | 2019112642 A1 | 6/2019 |

*Primary Examiner* — Girumsew Wendmagegn

(57) ABSTRACT

The described embodiments include systems and methods for producing and adapting images, such as video images, for presentation on display devices that have various different aspects ratios, such as 4:3, 16:9, 9:16, etc. In one embodiment, a method for producing content, such as video images, can begin by selecting an original aspect ratio and determining, within at least a first scene in the content, a position of a subject in the first scene. In one embodiment, the original aspect ratio can be substantially square (e.g., 1:1). Metadata can then be created, based on the position of the subject in the first scene, to guide playback devices to asymmetrically crop the content, relative to the position, for display on display devices that have aspect ratios that are different than the original aspect ratio. Other methods and systems are also described.

19 Claims, 10 Drawing Sheets

(51) Int. Cl.
*H04N 21/442* (2011.01)
*H04N 21/81* (2011.01)

(56) References Cited

U.S. PATENT DOCUMENTS

| | | |
|---|---|---|
| 2015/0348588 A1 | 12/2015 | Voss |
| 2017/0249719 A1 | 8/2017 | Kansara |
| 2019/0297248 A1 | 9/2019 | Jiang |
| 2021/0334547 A1* | 10/2021 | Cohen-Tidhar ........ G06V 10/82 |

* cited by examiner

610-ROI-B

PRODUCING AND ADAPTING VIDEO IMAGES FOR PRESENTATION ON DISPLAYS WITH DIFFERENT ASPECT RATIOS

CROSS-REFERENCE TO RELATED APPLICATIONS

This application is a U.S. National Stage of International Application No. PCT/US2021/036698, filed Jun. 2 2021, which claims the benefit of priority from U.S. Provisional Patent Application No. 63/068,201 filed on 20 Aug. 2020; U.S. Provisional Patent Application No. 62/705,115, filed on 11 Jun. 2020, and European Patent Application No. 20179451.8, filed on 11 Jun. 2020, each one incorporated by reference in its entirety.

Content creation, such as the creation of movies or TV shows or animations, and content capture, such as the recording of live sports events or news events, require the selection of an aspect ratio for what may be called an image canvas. This selection may be deliberative (e.g., a content creator considers several possible options for an aspect ratio of an image canvas and selects one) or happenstance (e.g., a camera operator at a recording studio grabs a particular camera that has a predetermined aspect ratio without thinking about its capture aspect ratio). Once the aspect ratio of the image canvas is selected, the content is created or captured and then distributed for playback on devices that can have many different aspect ratios. In many cases, the content creator will capture or create content in an image canvas having a first aspect ratio and then will crop or pad the content for an expected playback aspect ratio that is different than the first aspect ratio. The expected playback aspect ratio may be the aspect ratio that the content creator believes will be the most common aspect ratio used on playback devices. The content is then released and distributed to playback devices which have many different aspect ratios that are all different than the original canvas and the expected playback aspect ratio. All such playback devices will then be required to adapt the display of content by cropping or padding the content to match the display device coupled to the playback device. In this example, the content is cropped and/or padded at least twice. This process of padding and cropping at least twice may cause unnecessary cropping or padding in the image and thus prevent the intent of the content creator from being preserved through the process of multiple adaptions of the content for the different aspect ratios.

SUMMARY OF THE DESCRIPTION

The aspects and embodiments described in this disclosure can provide systems and methods that can use a substantially square aspect ratio for the original image canvas and use associated metadata that allow a wide variety of endpoint aspect ratios to be derived from the original content that uses the original image canvas or a set of original image canvases.

In one embodiment, a method for producing content, such as video images, can begin by selecting an original aspect ratio for an image canvas and determining, within at least a first scene in the content on the image canvas, a position of a subject in the first scene. In one embodiment, the original aspect ratio can be substantially square (e.g., 1:1). The subject can be a region of interest in the content, such as an actor or other focus of the scene. Metadata can then be created, based on the position of the subject in the first scene, to guide playback devices to asymmetrically crop the content, relative to the position, for display on display devices that have aspect ratios that are different than the original aspect ratio. The metadata can guide how a playback device can asymmetrically expand a view around the subject based on the position of the subject on the canvas and the aspect ratio of the playback device's display. In one embodiment, the metadata can guide an asymmetric expansion also based on other factors such as a desire to avoid partial inclusion of certain image elements, such as the partial inclusion of a person's face, and the metadata can provide data that is used to prevent the partial inclusion of such elements (which can mean that such elements are either completely excluded or completely included in the cropped view). Such image elements can be added into the region of interest to ensure they are either fully included in a view or fully excluded in a view. For example, such image elements can be added by defining the size of the region of interest to include such image elements. The content and the metadata can be stored and then distributed to playback devices that have different aspect ratios. The metadata can be used by the playback devices to adapt the content, by cropping and padding if necessary, to the display used by the playback device. Metadata can be created on a scene by scene basis in one embodiment, and a scene can be as short as a single frame of video content such that the metadata can be on a frame by frame basis, where a frame is one image presented during a single refresh interval on a display device. Thus, in one embodiment, the metadata described herein can be created on a frame by frame basis in order to capture frame by frame changes over time. Also, the original aspect ratio may not be static during the content, and thus the original aspect ratio may change during the content and even on a scene by scene basis (or even frame by frame basis) for at least a portion of the content; the change in the original aspect ratio may be referred to as a variable aspect ratio that varies during the content.

In one embodiment, the original aspect ratio can be selected to be substantially square such as 1:1 or more square than the 16:9 aspect ratio such that the ratio of the length to the height for the original aspect ratio is less than the ratio of 16:9 (16/9=1.7778) and greater than or equal to 1:1. A substantially square original aspect ratio can ensure the widest range of options for adapting content to most aspect ratios of the universe of playback devices. In an alternative embodiment, the original aspect ratio can be selected to prioritize image quality in a vertical playback orientation, such as a portrait orientation, in which case the original aspect ratio can be substantially square (1:1) in a range from 1:1 to less than 1:1 down to 9:16. The canvas area may be different for each frame or scene or from shot to shot to provide a great deal of flexibility in content creation. As noted herein, the original aspect ratio may change over time of the content, and thus the content can include a variable aspect ratio.

The metadata can be a vector that specifies a direction relative to the subject (e.g., a region of interest) in the current scene. The playback device can use the metadata to construct a cropping and/or padding of the image to render the scene based on the metadata. In effect, the metadata can guide the playback device to crop or expand into the full canvas in a direction away from the subject while maintaining the subject as a focus of the cropped scene. The playback device can also use tone mapping and color volume mapping that is tailored to the adapted aspect ratio so that the tone mapping and color volume mapping are based on the actual content (e.g., the region of interest) in the adapted aspect ratio rather than all of the content in the original image canvas for the scene.

In one embodiment, a method of determining the subject and the position of the subject can be done for multiple different scenes spanning the same or different subjects. In one embodiment, the method can be done for each scene or frame or set of frames in the content or least a subset of the scenes in the content so that, for at least a subset of the scenes, each scene or frame can be adapted for different aspect ratios at playback time based upon the metadata created during content creation. In one embodiment, a scene (e.g., a set of one or more frames) can be a camera shot or take in a movie production or other content production, and different scenes can have different subjects, backgrounds, camera angles, etc.

During the content creation process, one or more previews of the displays of the content at different aspect ratios can be generated based on the generated metadata, and a content creator can, after viewing the previews, edit the metadata either directly or by revising the position of the subject or selecting a different subject, etc. and then display the one or more previews to see if the revisions improve the appearance of the content in the different previews. In one embodiment, the one or more previews can be one or more rectangular overlays on the original canvas with the content of the scene displayed in the overlays.

In one embodiment, a user interface on the playback device can allow the user to toggle the playback operation between cropping (e.g., the cropping done based on the metadata described herein) and padding which reverts to the common practice of padding pixels (usually black pixels) around the substantially square canvas to fill the entire aspect ratio of the display. This toggling can allow the user to see more of the original canvas in one embodiment instead of the focused view that can be provided by the use of cropping based on the metadata described herein. In one embodiment, the image may be further zoomed beyond what is necessary to match the aspect ratio of the playback device to provide an enhanced (closer) view into the subject area. In one embodiment, the transition between the cropping, padding and/or zooming viewing states can be displayed with a smooth transition to give the appearance to the user/viewer of the playback device of a smooth or seamless transition between the viewing states.

In one embodiment, a final composited image to be shown to a user may correspond to the superposition of multiple inputs in multiple windows or regions of a screen. For example, a main input may be shown in a large window on a display and a secondary input may be shown in a smaller window (similar to a picture in a picture feature on televisions) that is smaller or much smaller than the large window. For example, a main input window may display the view generated from the metadata to provide a cropped view of the original or full canvas based on the position of the subject and the aspect ratio of the main input window or the display device and the secondary window can show the full or original canvas without any cropping or padding. In one embodiment, one or both of these windows may be zoomed completely or partially. Moreover, the methods and systems described herein may be used to optimize the playback of the content for any arbitrary size and aspect ratio of each window. If one of the windows is resized, the methods and systems can be used to adapt the output to the resized aspect ratio (of the resized window) using the metadata and position of the subject within the scene. Furthermore, the methods and systems described herein can be used for single windows (without a secondary window) such that the content is cropped within the window based on the aspect ratio of the window, and the methods and systems can optimize the playback using the metadata as described herein.

In another embodiment, the methods and systems described herein can be used to enhance the transition between the playback of photos in a photo stream by focusing on the subject of interest while applying slight zoom and pan to create an interesting effect while also optimizing tone mapping for the selected region. This may be guided by metadata that can be considered as an "intended motion path". In one embodiment, the "intended motion path" is used in lieu of tracking a viewer position in order to provide a "guided Ken Burns effect." The metadata is a series of position vectors (X,Y,Z) coordinates relative to the screen that describe an intended motion path for a viewer, over a specified period of time. As used herein, the term "Ken Burns effect" denotes a type of panning and zooming effect used in film and video production when showing still pictures.

In one embodiment, the original or full canvas may already contain some padding to fit an image into the aspect ratio of the canvas. In this case, an embodiment can use additional metadata to indicate the location of the active region within the canvas, and if this metadata is present, a client device or playback device can use this additional metadata to adapt the playback based on only the active region of the canvas (without including the padded region).

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in nonvolatile memory, such as flash memory, or dynamic random access memory (DRAM) which is volatile or other forms of memory.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The present description includes material protected by copyrights, such as computer program software. The owner of the copyright, including the assignee of the present invention, hereby reserves its rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Dolby Laboratories, Inc.

Figure 1A:
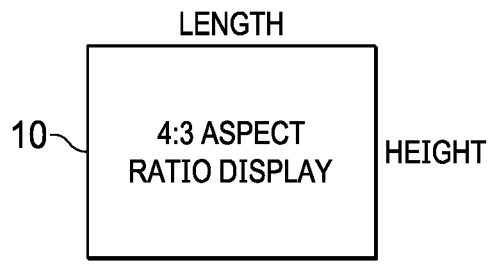
FIGS. 1A, 1B, and 1C show examples of different aspect ratios of display devices that can be used with one or more embodiments described herein.
Figure 1B:
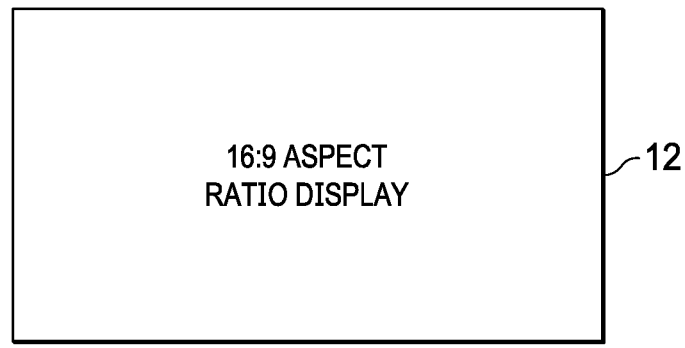
Figure 1C:
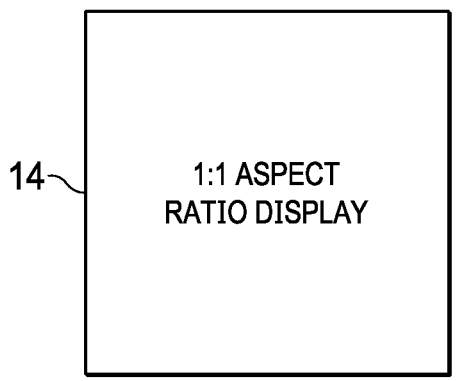

The embodiments described herein can create and use metadata to adapt content from an original or full canvas for output on different display devices that have different aspect ratios. These display devices can be conventional LCD or LED displays that are part of a playback device, such as a tablet computer or a smart phone or a laptop computer or a television or may be conventional displays that are separate from but coupled to the playback device that drives the display by providing an output to the display. FIGS. 1A, 1B and 1C show three examples of 3 different aspect ratios. In particular, FIG. 1A shows an example of a display that has a 4:3 aspect ratio (which is the ratio of the length to the height of the viewable area of the display panel); thus if the length of the displayed area on the display is 8 inches, then the height of the displayed area on the display will be 6 inches in the case of a display that has an aspect ratio of 4:3. Most CRT televisions had this aspect ratio. FIG. 1B shows an example of a display panel that has a display area with an aspect ratio of 16:9; display panels for laptop computers and televisions often use this aspect ratio. FIG. 1C shows an example of a display panel or image canvas that has an aspect ratio of 1:1, and thus the image canvas is square (the length and height of the viewable area are the same). As will be described below, one embodiment uses an original image canvas, during the content creation process, that has an aspect ratio of either 1:1 or substantially close to a square image canvas. An example of a content creation process will now be provided with reference to FIG. 2A.

Figure 2A:
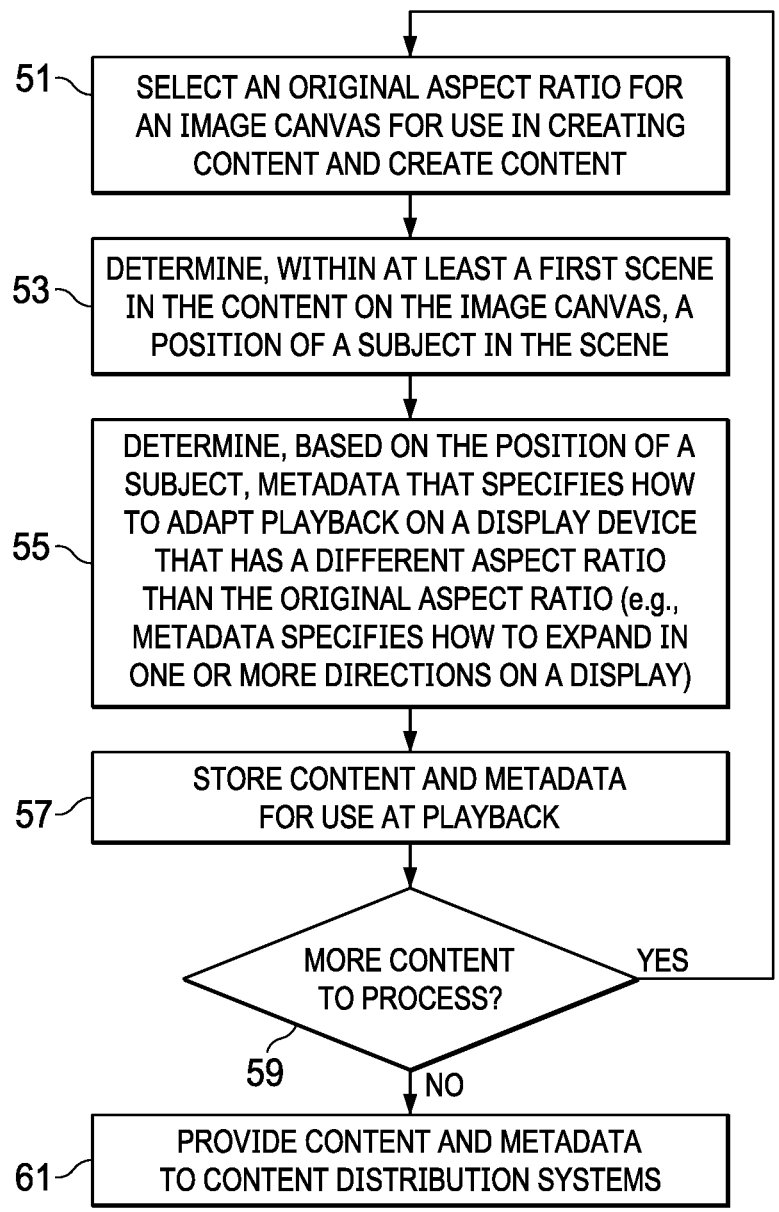
FIG. 2A is a flowchart that shows a method according to one embodiment that can be used to create content with metadata for adapting an output to different aspect ratios.

Referring now to FIG. 2A, a method according to an embodiment can begin in operation 51; in operation 51 an original aspect ratio for an image canvas is selected. Once selected, the image canvas is used to create content. Content creation can be the creation of images (such as computer generated graphics or animation) or the capture of content with a camera (such as a movie camera used with live actors) or other techniques known in the art to create content or combinations of such techniques. The same or different image canvases can be used during the content creation process; the canvas area may be different for each frame or set of frames or from scene to scene to provide the best flexibility in content creation. In one embodiment, the original image canvas can be a square canvas (with an aspect ratio of 1:1) or a substantially square canvas. In one embodiment, an image canvas is substantially square if the image canvas is more square than a canvas that has a 16:9 aspect ratio such that the ratio of the length to the height for the image canvas is less than the ratio of 16:9 (which is about 1.778) and greater than or equal to 1:1. A substantially square original aspect ratio can ensure the widest range of options for adapting content to most aspect ratios across the universe of playback devices. Other embodiments may use image canvases that are not substantially square, but this may affect how well the scenes are adapted for different displays that have different aspect ratios.

In operation 53 shown in FIG. 2A, a position of a subject in a scene in the content is determined. Operation 53 can be performed during content creation or after content creation (during an editing process that edits the content that was created) or both during and after content creation. Operation 53 can begin by identifying or determining the subject or region of interest in a particular scene. This determination or identification of the subject or region of interest can be performed on a scene by scene basis for all scenes in the content or for at least a subset of all scenes in the content. For example, a first scene can have a first identified subject, and a second scene can have a second identified subject which is different than the first identified subject; further, different scenes can include the same subject which has been identified in the different scenes, but the position of that subject may be different in the different scenes. In one embodiment, the identification or determination of the subject or region of interest can be performed manually by a content creator or automatically by a data processing system. For example, the data processing system can use well-known face detection algorithms, image salience analysis algorithms, or other well-known algorithms to automatically detect one or more faces in a scene; the automatic detection of a subject in one embodiment can be manually overridden by the content creator. In one embodiment, the content creator may instruct the data processing system used in the content creation process to automatically determine the subject for one subset of scenes while reserving another subset for manual determination by the content creator. Once the subject has been determined, the position of the subject in operation 53 can be determined either manually or automatically based upon a centroid of the subject. For example, if a subject's face has been identified as the subject or region of interest, the centroid of the face can be used as the position on the image campus of the subject in operation 53. In one embodiment, the position may be edited manually by a content creator if the position is determined automatically by a data processing system. In one embodiment, whether the position is determined manually or automatically, content creation tools or editing tools may enable a user to select a center pixel (such as Sx, Sy) for the subject and optionally a width and a height for the subject (such as Sw, Sh) for use when adapting the image for playback on a particular display device's aspect ratio. After operation 53 has been performed, processing may proceed to operation 55 as shown in FIG. 2A.

Figure 3A:
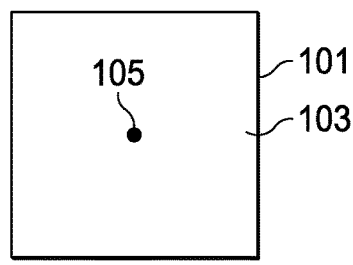
FIGS. 3A, 3B, 3C, and 3D show examples of positions of subjects and associated metadata based on those positions.
Figure 3B:
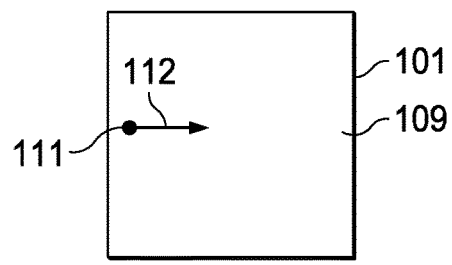
Figure 3C:
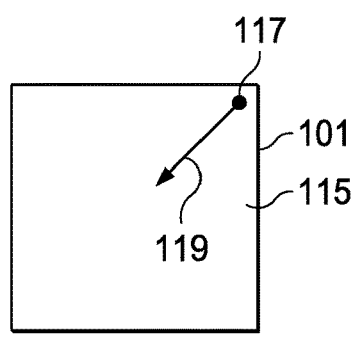
Figure 3D:
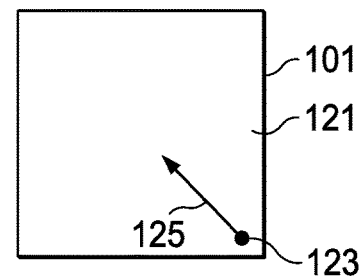

In operation 55, a data processing system can determine metadata automatically based upon the position of the subject in a particular scene. The metadata can specify how to adapt playback on a display device that has a different aspect ratio than the original aspect ratio of the original image canvas. For example, the metadata can specify how to expand into the original aspect ratio, from the position of the subject, in one or more directions within the original aspect ratio to crop the image in the original aspect ratio to adapt it for playback to a particular aspect ratio of the display device controlled by the playback device. In one embodiment, the metadata can be expressed as a vector which specifies a direction away from a determined subject. FIGS. 3A, 3B, 3C, and 3D show examples of such metadata which can be in the form of a vector. FIG. 3A shows an example of a subject 105 near the center of the scene 103 in the original image canvas 101. FIG. 3B shows an example of a subject 111 on the left side of the scene 109 in the original image canvas 101; as shown in FIG. 3B, the subject 111 is centered vertically along the left side in the scene 109. FIG. 3C shows an example of a subject 117 in the upper right corner of the original image canvas 101 in scene 115. FIG. 3D shows an example of a subject 123 in the lower right corner in the scene 121 in the original image campus 101. In the example shown in FIG. 3A, the vector representing an example of the metadata is deemed to be equal in all directions from the subject and thus can be considered to have a value of 0,0 in this case. The expansion from the subject in the example of FIG. 3A occurs by cropping the original image canvas based upon the aspect ratio of the playback device and the orientation (for example, landscape or portrait) of the display device; FIGS. 4A through 4D show four examples, which will be described further below, of how content is adapted for playback on different aspect ratios when the subject is centered within the original image canvas. In the example shown in FIG. 3B, a vector 112 is an example of the metadata which specifies the direction to crop into the original image campus 101 the keep the subject 111 in focus regardless of the aspect ratio of the display device and the orientation of the display device. FIGS. 4E, 4F, 4G, and 4H show four examples of how content is adapted for playback on different aspect ratios when the subject is positioned as shown in FIG. 3B. In the example shown in FIG. 3C, the vector 119 is an example of the metadata which specifies the direction to crop into the original image campus 101 to keep the subject 117 in focus regardless of the aspect ratio of the display device and the orientation of the display device. FIGS. 4I, 4J, 4K and 4L show four examples of how content can be adapted for playback on different aspect ratios when the subject is positioned as shown in FIG. 3C. In the example shown in FIG. 3D, the vector 125 can be metadata which specifies the direction to crop into the original image canvas 101 to keep the subject 123 in focus regardless of the aspect ratio of the display device and the orientation of the display device.

The vectors, representing the metadata, can guide playback devices on how to crop into the original image canvas based on the metadata and subject's position. In one embodiment, instead of cropping symmetrically around the subject, the vectors (such as vectors 112, 119, and 125) guide asymmetric cropping relative to the subject as explained further below. Asymmetric cropping in this fashion can provide at least two advantages: (a) the aesthetic framing of the scene is better preserved; an image with a subject in the top right corner (e.g., see FIG. 3C) still results in an image with the subject in the top right even after intermediate levels of zoom, allowing better preservation of the creative intent of the framing compared to a symmetric crop; and (b) asymmetric cropping makes it possible to zoom into the subject without abrupt changes in the direction or rates of zoom. In one embodiment, the vector can include an x component (for the x axis) and a y component (for the y axis), and the vector can be expressed by 2 values: Px and Py, where Px is the x component and Py is the y component of the vector. In one embodiment, Px can be defined by: Px=2(0.5−Sx), and Py can be defined by Py=2(0.5−Sy), where Sx and Sy are the center of the subject in relation to the original image canvas, and the coordinates 0,0 are at the top left corner of the original image canvas and the bottom right corner of the canvas has the coordinates 1,1 and the center of the original image canvas has the coordinates of 0.5, 0.5. In the case of the example shown in FIG. 3B, Px=1 and Py=0 and this vector is deemed to be positive in the horizontal direction. In the case of the example shown in FIG. 3C, Px=−1, and Py=1 and this vector can be deemed to be negative in the horizontal direction and positive in the vertical direction. Further details and examples of this metadata and how this metadata is used at playback are provided below.

Referring back to FIG. 2A, after operation 55 has been completed for a particular scene, processing can proceed to operation 57 in which the content and metadata is stored for use at playback time. Then in operation 59, the data processing system which is being used during content creation or during the editing process determines whether there is more content to process. For example, if there are further scenes that need to be processed according to the method shown in FIG. 2A, processing reverts back to operation 51 in which a new original aspect ratio can be selected for an image canvas or the last used original aspect ratio for the image canvas can continue to be used in the creation and/or editing of the content. The decision in operation 59 can be a manual decision controlled by the human operator of the data processing system in one embodiment. If there is no further content to process, then the content and metadata which has been saved can be provided, in operation 61, to one or more content distribution systems. For example, the content and the metadata can be provided to cable networks for distribution to set-top boxes or can be distributed to content providers such as, for example, such as content providers that deliver content through the internet, etc. The content and metadata can be distributed to the use of streaming media or through the use of downloads of an entire copy of the content and metadata.

Figure 2B:
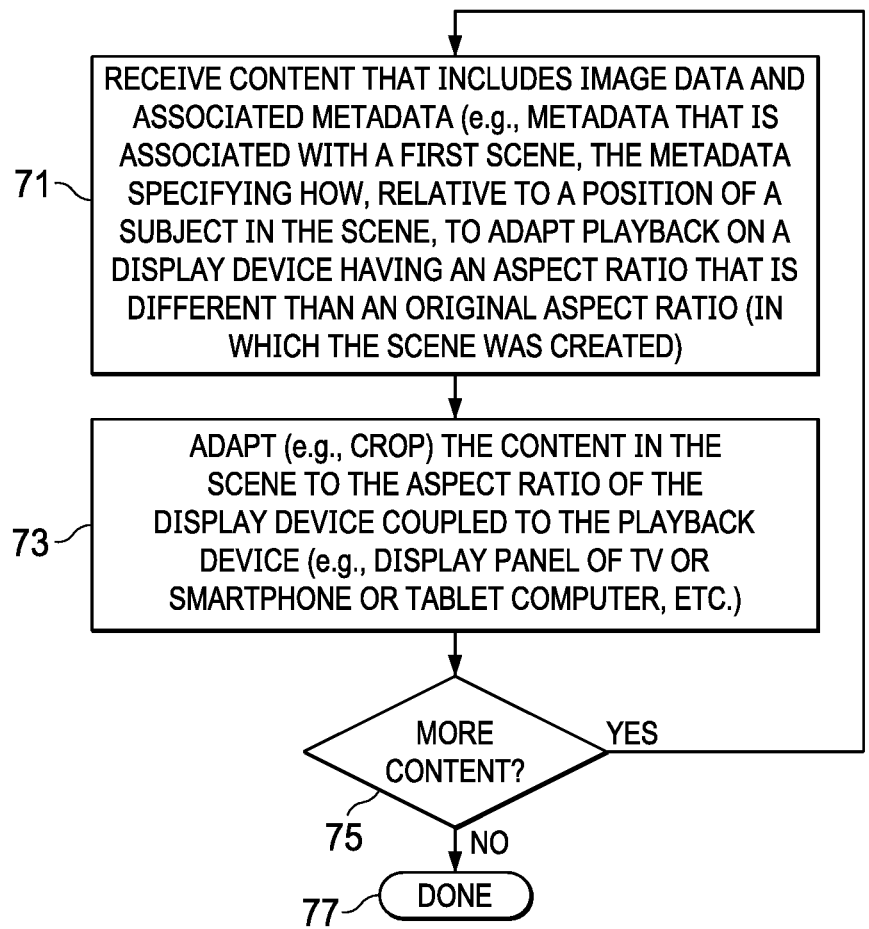
FIG. 2B is a flowchart that shows a method according to one embodiment that can be used to adapt playback at a playback device based on the aspect ratio of the playback device and based on metadata associated with the content.

The method shown in FIG. 2A is a content creation method that can be performed in a movie studio or other facilities that create content. This method is typically performed separately from the playback on a playback device, and FIG. 2B shows an example of a method on a playback device. However, in one embodiment, the method shown in FIG. 2A can also be performed together with the method shown in FIG. 2B on the same device which both creates the content and then displays the content on one or more display devices that have an aspect ratio that is different than the aspect ratio of the original image canvas.

A method for playback, as shown in FIG. 2B, can begin in operation 71. In operation 71, a playback device can receive content that includes image data and can also receive associated metadata. For example, the metadata can be associated with the first scene, and the metadata can specify how, relative to a position of a subject in the scene, to adapt playback to a display device having an aspect ratio that is different than an original aspect ratio in which the scene was created. In one embodiment, the metadata can take the form of a vector, such as the vectors 112, 119, and 125 shown in FIGS. 3B, 3C, and 3D. These vectors may be expressed as Px, Py values which are provided with the content for the scene that is associated with this metadata. Once the metadata is received in operation 71, the playback device can perform operation 73. In operation 73, the playback device adapts the content in the scene to the aspect ratio of the display device that is coupled to the playback device. For example, the display device may be a display panel of a television or smart phone or tablet computer, and the playback device adapts the content by cropping the content in the scene to adapt the content to the aspect ratio of the display device. This adaptation or cropping uses the metadata described herein to asymmetrically, in one embodiment, crop the content based upon the position of the subject and the metadata which can be a vector as described herein. This adaptation or cropping can also include a tailored tone mapping and color volume mapping that is based upon the cropped content (containing for example only the region of interest) displayed within the aspect ratio of the display device as opposed to tone mapping and color volume mapping that is based upon the entire image in the original image canvas.

Figure 4A:
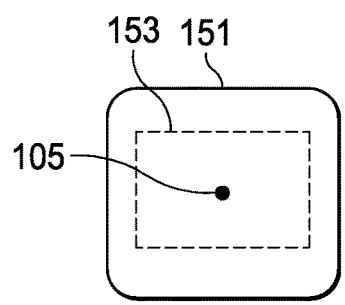
FIGS. 4A, 4B, 4C, 4D, 4E, 4F, 4G, 4H, 4I, 4J, 4K, and 4L show examples of how a playback device can use the metadata and the aspect ratio of the playback device to crop asymmetrically the image on the original canvas based upon the metadata and the aspect ratio.
Figure 4B:
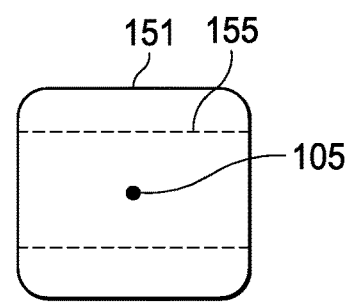
Figure 4C:
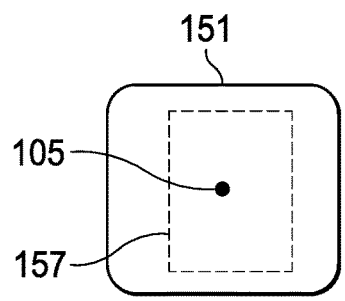
Figure 4D:
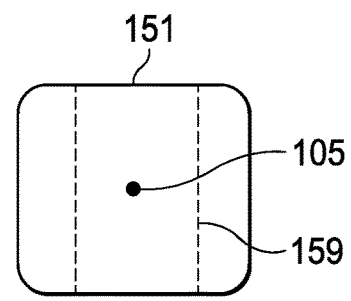

While a detailed example of an implementation of operation 73 will be provided below, it is helpful to provide a general description of the adaptation process by referring to FIGS. 4A through 4L. In the examples shown in FIGS. 4A, 4B, 4C, and 4D, operation 73 crops the content symmetrically relative to the subject 105 in the original image canvas 51 depending upon the aspect ratio of the display device and the orientation of the display device. FIG. 4A shows an aspect ratio 153 created by operation 73 that has cropped the content in landscape mode in the original image canvas 151 symmetrically around the subject 105. FIG. 4B shows an aspect ratio 155 that results from cropping in operation 73 that crops the content in landscape mode into an aspect ratio 155. FIG. 4C shows an aspect ratio 157 that results from cropping in operation 73 that crops the content in portrait mode into the aspect ratio 157. FIG. 4D shows an aspect ratio 159 that results from cropping in operation 73 that crops the content in portrait mode into the aspect ratio 159. In each of these examples shown in FIGS. 4A, 4B, 4C, and 4D, the vector metadata can be a vector value of Px=0, Py=0, in this vector metadata causes the symmetrical cropping around the subject 105 into the original image canvas 151 based upon the aspect ratio of the display device used to display the content. In the examples shown in FIGS. 4A, 4B, 4C, and 4D, the focus of the displayed output remains on the subject 105 in all cases regardless of the aspect ratio and the display orientation (e.g., portrait or landscape).

Figure 4E:
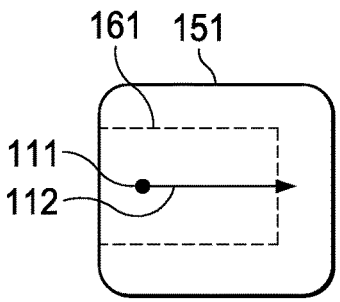
Figure 4F:
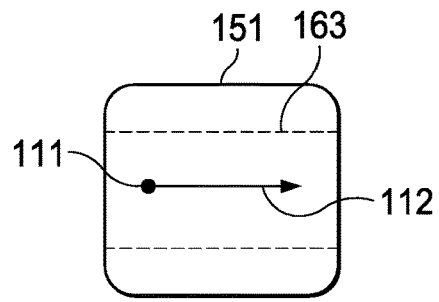
Figure 4G:
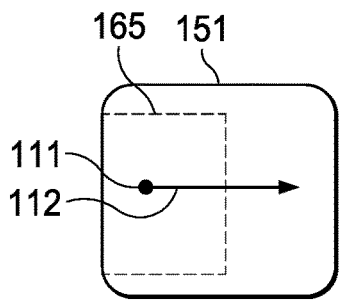
Figure 4H:
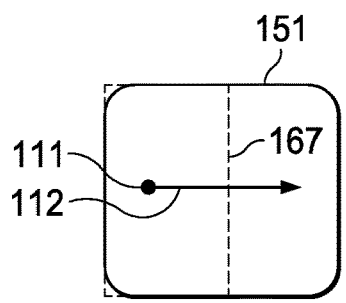

In the examples shown in FIGS. 4E, 4F, 4G, and 4H, operation 73 crops the content in the original image canvas asymmetrically relative to the subject 111 based upon the vector 112 which specifies how to crop asymmetrically in this example. FIG. 4E shows an aspect ratio 161 that results from cropping in operation 73 that crops the content in landscape mode into the aspect ratio 161 based upon the vector 112. FIG. 4F shows an aspect ratio 163 that results from cropping in operation 73 that crops the content in landscape mode into the aspect ratio 163 based upon the vector 112. FIG. 4G shows an aspect ratio 165 that results from cropping in operation 73 that crops the content in portrait mode into the aspect ratio 165 based upon the vector 112. FIG. 4H shows an aspect ratio 167 that results from cropping in operation 73 that crops the content in portrait mode into the aspect ratio 167 based upon the vector 112. It can be seen in the example shown in FIGS. 4E, 4F, 4G, and 4H that the cropping maintains the subject 111 on the left side of the cropped view into the original image canvas 151 whether in landscape mode or portrait mode and regardless of the aspect ratio of the display device.

Figure 4I:
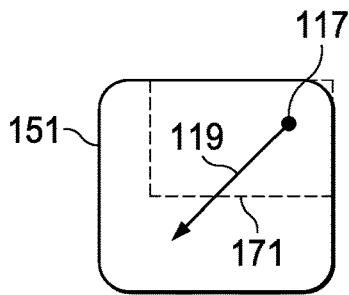
Figure 4J:
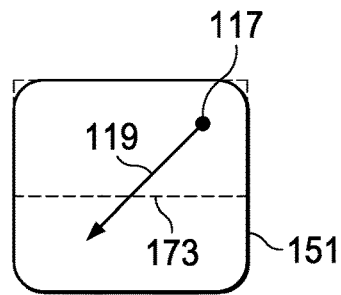
Figure 4K:
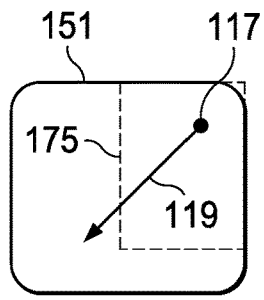
Figure 4L:
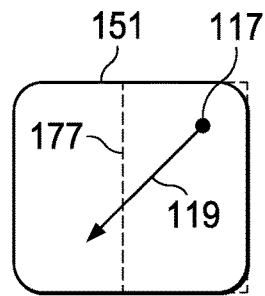

In the examples shown in FIGS. 4I, 4J, 4K, and 4L, operation 73 crops the content in the original image canvas asymmetrically relative to the subject 117 based upon the vector 119 which specifies how to crop asymmetrically in this example. FIG. 4I shows an aspect ratio 171 that results from cropping in operation 73 that crops the content in landscape mode into the aspect ratio 171 based upon the vector 119. FIG. 4J shows an aspect ratio 173 that results from cropping in operation 73 that crops the content in landscape mode into the aspect ratio 173 based upon the vector 119. FIG. 4K shows an aspect ratio 175 that results from cropping in operation 73 that crops the content in portrait mode into the aspect ratio 175 based upon the vector 119. FIG. 4L shows an aspect ratio 177 that results from cropping in operation 73 that crops the content in portrait mode into the aspect ratio 177 based upon the vector 119. It can be seen in the example shown in FIGS. 4I, 4J, 4K, and 4L, that the subject 117 remains in the upper right corner of each cropped output regardless of the orientation of the display device and regardless of the aspect ratio of the display device.

Referring back to FIG. 2B, after operation 73, the method determines whether there is more content to process in operation 75. If there is more content to process, then processing reverts back to operation 71 to continue to receive content and metadata and to adapt the content to the display device as described herein. If there is no further content than processing proceeds to operation 77 in the method is concluded.

Figure 5:
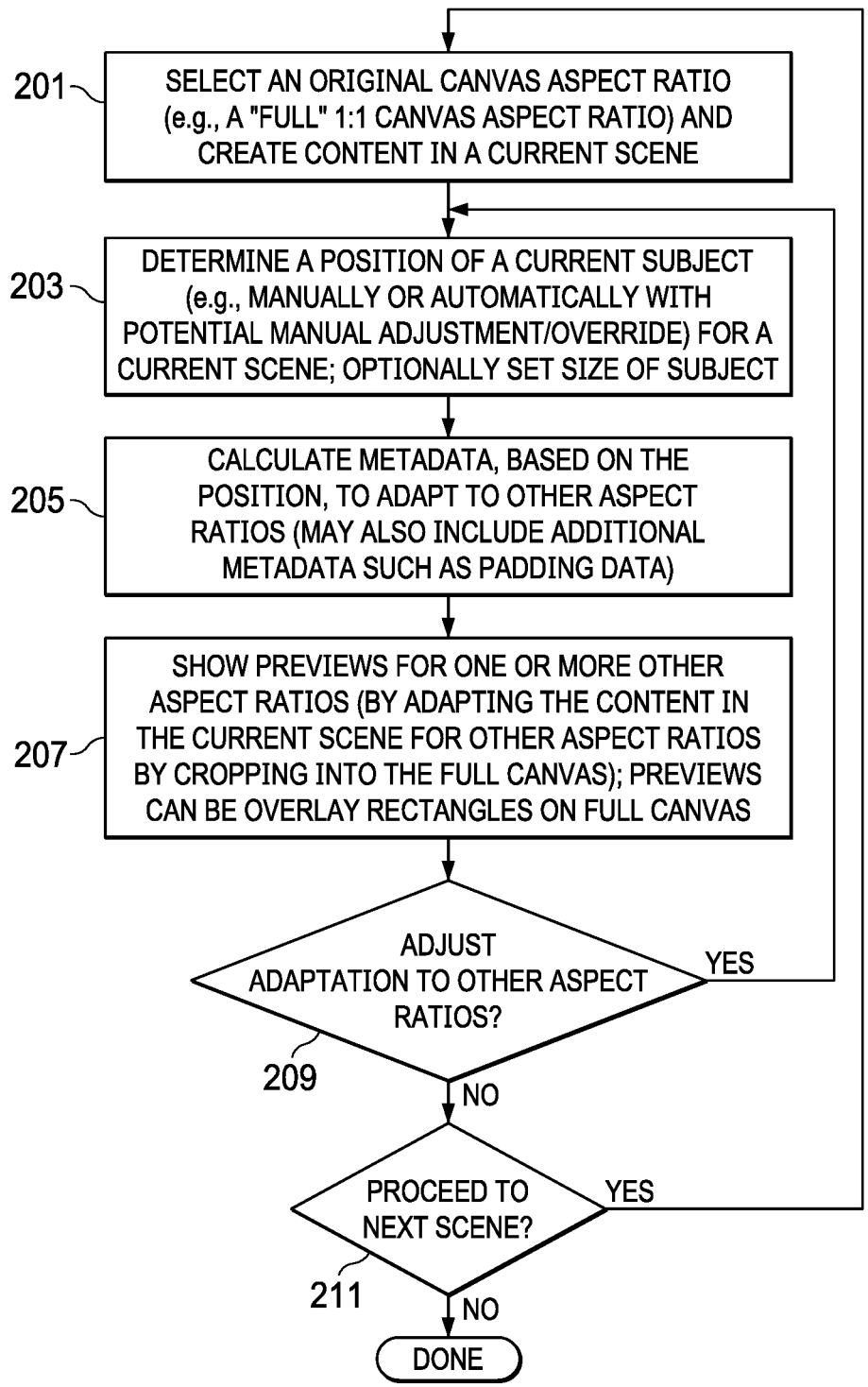
FIG. 5 is a flowchart that shows a method to create content according to one embodiment.

FIG. 5 shows another example of a method which can be performed during content creation or during editing of content that has been created and stored and is ready for editing. In operation 201 shown in FIG. 5, a content creator can select an original canvas aspect ratio such as a 1:1 aspect ratio and create content in a current scene. Then in operation 203, the content creator or the data processing system can determine a position of a current subject for a current scene. The determination of the position may be manually performed by the content creator or automatically performed by the data processing system with the potential for manual adjustment or override for the current scene. Optionally, the editing or content creation tools can allow the content creator or the data processing system to set the size of the subject in addition to a center point of the subject, such as a point at the coordinates Sx, Sy as described herein. Then in operation 205, the data processing system can calculate, based on the position, metadata which can be used to adapt the content to other aspect ratios, and this metadata may also include (optionally) additional metadata such as metadata describing padding around the image. Then the content creator can cause previews for one or more other aspect ratios to be displayed by adapting the content in the current scene for such other aspect ratios. In other words, the content creator can cause the data processing system to generate the display of previews of the content so that the content creator can view each of the previews at the different aspect ratios to determine whether the adaptation or cropping is desirable or satisfactory. In one embodiment, the previews can be overlaid rectangles on the image in an original image Playback devices should enforce this behavior and tolerate non-conforming metadata.

In the case of 0 offsets, the entire image is indicated to be the region of interest.

In the case of zero pixel width and height, the top-left corner of the rectangle is indicated to be the region of interest, which corresponds to the center of the subject.

Additional metadata, to be used as described below can include the following:

| | Description | Range | Default | Precision (bits) |
|---|---|---|---|---|
| TopOffset | Offset of top of the Region of Interest (ROI) from the top of the image frame at ¼ pixel resolution | [0, 65535] | 0 | 16 |
| BottomOffset | Offset of bottom of the ROI from the bottom of the image frame at ¼ pixel resolution | [0, 65535] | 0 | 16 |
| LeftOffset | Offset of left of the ROI from the left of the image frame at ¼ pixel resolution | [0, 65535] | 0 | 16 |
| RightOffset | Offset of right of the ROI from the right of the image frame at ¼ pixel resolution | [0, 65535] | 0 | 16 |
| MidOffset | Mid luminance offset to the "L1.Mid + L3.MidOffset" from the average of the whole frame | [−1, 1] | 0 | 12 | canvas, such as rectangles showing the various aspect ratios (e.g., 161) shown in FIGS. 4A through 4L. These previews will show how the content will appear to an end user of a playback device. The locations for the rectangles are derived based on the cropping operation that uses the metadata, such as the cropping operation 73 in FIG. 2B. The metadata provides the advantage of a defined playback processing behavior to show an accurate preview of exactly how the content will be rendered on a variety of different playback devices having different display devices with different aspect ratios. The finding the playback behavior in this way allows a content producer to preview the exact final result and make any adjustments that may be desirable or necessary. Thus, in operation 209, the content creator can decide whether or not to adjust the adaptation for one or more aspect ratios. If it is desired to adjust the adaptation, processing can revert back to operation 203 in which the content creator can revise the position of the current subject or perhaps select a different subject using content creation tools or editing tools to select different positions or different subjects. If no adjustments are deemed necessary in operation 209, the content creator can move to the next scene determine whether or not to process the next scene in operation 211. If all scenes that are desired to be processed have been processed, processing can be completed and ended as shown in FIG. 5; on the other hand if there are additional scenes that need to be processed, then processing reverts back to operation 201 as shown in FIG. 5.

The following sections provide detailed examples of metadata and method of using the metadata to crop content for playback on different aspect ratios. The metadata can be specified in a compliant bit stream in one embodiment as follows. One or more rectangular regions define the subject region:

Rectangles should be defined such that (Top)<=(1−Bottom) and (Left)<=(1−Right). The values of TopOffset, BottomOffset, LeftOffset and RightOffset should be set accordingly.

The coordinates may change each frame, or each shot, or may be static for an entire piece of content. Any changes can be exactly frame-synchronous to between the image and the corresponding metadata.

If the canvas is resized before distribution, for example in an adaptive streaming environment, the offset coordinates are also updated accordingly.

The following section describes adapting the content in the playback device, and optimizing color volume mapping for the adapted content in the playback device. This section assumes the playback device performs all of these operations locally on the playback device, but in an alternative embodiment, a centralized processing system can perform some of these operations for one or more playback devices that are coupled to the centralized processing system.

At playback, the playback device is responsible for adapting the canvas and associated metadata to the specific aspect ratio of the attached panel. This comprises three operations, described below. For example, in one embodiment:

1: Calculate Area of Interest and Update Mapping Curve:

The coordinates of the area of interest of the canvas, or the area to be displayed on the panel, are calculated by computing the top-left and bottom-right pixels, TLx, TLy, BRx, BRy, and the width and height of the canvas (CW, CH); for example, a method can perform calculations based upon the equations immediately below or based upon the software implementation provided further below:

$$TLx=(Sx-Px)*CW \quad\quad 1)$$

$$TLy=(Sy-Py)*CH \quad\quad 2)$$

$$BRx=(Sx+Px)*CW \quad\quad 3)$$

$$BRy=(Sy+Py)*CH \quad\quad 4)$$

In addition to the adaptive resizing of the image in accordance to the region of interest, the tone mapping algorithm can also be adjusted to achieve optimal tone mapping for the cropped region (as opposed to the entire original image in the original image canvas. This can be accomplished by calculating additional metadata that corresponds to the region of interest, and using this to adjust the tone mapping curve, as described, for example, in U.S. Pat. No. 10,600,166 (which describes a Display Management process that is known in the art), which takes as one input the "smid" (average luminance) parameter representing the average brightness of the source content. The adjustment, using this new ROI luminance offset metadata (e.g., denoted as L12MidOffset), is calculated as follows:

$SMid=(L1.Mid+L3MidOffset)$//Compute mid luminance for the entire frame $SMid'=SMid*(1-ZF)+(SMid+L12MidOffset)*ZF$// Adjust for ROI where ZF is the zoom fraction, such that ZF=0 corresponds to full-screen and ZF=1 corresponds to fully zoomed in to the subject.
Note: L3MidOffset denotes an offset over the L1.Mid value and may also be referred to as L3.Mid.

Another parameter that is adjusted in a similar way is the optional global dimming algorithm used to optimize the mapping to a global dimming display. The global dimming algorithm takes as input two values, L4Mean and L4Power. Before calculating the global dimming backlight, the L4Mean value is adjusted by the zoom factor as follows:

$L4Mean'=L4Mean*(1-ZF)+(L4Mean+L12MidOffset)*ZF$

2: Cropping and Processing the Area of Interest

To make efficient use of memory and ensure consistent timing of the playback device, in a preferred embodiment a playback device should follow these operations:
  1) A bit stream encoded with region of interest (ROI) metadata (such as the vectors described by Px,Py) is decoded, with individual frames inserted into a decoded picture buffer.
  2) When it is time to display the current frame, only the portion of the image required by the ROI is read back from memory, starting with the top-left pixel (TLx,y) which is read some time t ("delay time") before it is to be presented on the panel. This delay time t is determined by the time required for the first pixel to be processed by the imaging pipeline and includes any spatial up-sampling performed by the imaging pipeline.
  3) Once the entire region of interest has been read from memory, the decoded picture buffer can be overwritten with a subsequent decoded picture.

Once the cropped region of the image has been read from memory, it is mapped to the dynamic range of the panel. This method can follow the known techniques described in U.S. Pat. No. 10,600,166 using the adjusted mapping parameters from operation 1 above.

3: Resizing to the Output Resolution

The final operation is to resize the image to the resolution of the panel. It is clear that the resolution, or size, of the final image may not match the resolution of the panel. A method for resizing the image must be applied to achieve the desired resolution, which is well known in the art. Example methods may include bilinear or Lancsoz resampling or many methods including super-resolution or neural networks.

In an embodiment, without limitation, the metadata used to signal the ROI and related parameters may be denoted as Level 12 (L12) metadata, summarized as follows:

1) A rectangle specifying the coordinates of the ROI:
  a. This rectangle is specified in relative offsets from the edges of the image, so that a default value of zero corresponds to the entire image
  b. The offsets are specified in percentage of image width and height with 16-bit precision. This method ensures the metadata remains constant even when the image is resized.
  c. If the offsets result in a ROI with zero pixels width and/or height, the single pixel in the top-left corner is considered as the ROI.
2) The average luminance of the ROI
  a. This value acts as an offset for the color volume metadata, to optimize the presentation of the ROI. The color volume mapping will preserve more of the contrast in the ROI as the ROI is expanded to fill the screen.
  b. Calculated in the same way as L1.Mid, but only using the pixels comprising the ROI. The value stored in metadata is the offset from the full-screen value to ensure that a value of zero reverts to using the L1.Mid value:
    i. L12.MidOffset=ROI.Mid−L1.Mid−L3.Mid
  Note: L1.Mid may be computed as average of the PQ-encoded maxRGB values of the image or as the average luminance maxRGB is the maximum of color component values {R, G, B} of a pixel. L3.Mid denotes an offset to the 'Mid' PQ value present in L1 metadata (L1.Mid).
  c. Playback devices smoothly interpolate this offset based on the relative size of the ROI being displayed. The value used by the display device may be generated as L1.Mid+L3.Mid+f(L12.MidOffset), where f denotes the interpolation function.
3) Optionally, the mastering viewing distance can be specified
  a. The mastering viewing distance is specified as a fraction of the reference viewing distance. This is used to ensure that the image is not scaled when viewed from the same mastering viewing distance.
  b. The default viewing distance is relative to a 17.7613 degrees viewing angle (calculated from 2*atan(0.5/3.2), which is the ITU-R reference viewing angle for full HD content). A closer distance (for example 0.5) would correspond to the viewing angle of 17.7613/0.5=35.5226. Note that the trigonometric functions are omitted for simplicity and to ensure that different aspect ratios are calculated equally.
  c. The range is 3/32 to 2 in increments of 1/128. The metadata is a 8-bit integer in the range of 11 to 255, which is used to calculate picture heights by:

Mastering Viewing Distance=$(L12.MVD+1)/128$ d. If not specified or it is in the range of 0 to 10, the default is 127, or a mastering viewing distance equal to the reference viewing distance. For new content, the value may be less, such as a value of 63 to indicate the mastering distance is the same as the reference viewing distance
4) Optionally, the distance of the subject (majority of the ROI) from the camera can be specified
  a. This can be used to enhance the "look-around" feature by allowing the image to pan and zoom at the correct speed in response to changes in viewer position. Objects that are further away pan and scale at a slower rate compared to objects that are nearby.

5) Optionally, an "intended viewer motion path" can be specified
   a. This can be used to guide a "Ken Burns" effect during playback, even when viewer tracking is not available or enabled. Examples would include a photo frame. By guiding the Ken Burns direction for panning and scaling, this feature allows an artist to specify a desired effect, whether it is to zoom in or zoom out of the subject, without the possibility of the main subject being inadvertently cropped off the image
6) Optionally, a separate layer for graphics or overlays can be specified
   a. This allows graphics to be scaled and composited on top of the image independently of the image scaling. Prevents important overlays or graphics from being cropped or scaled when cropping or scaling the image. Preserves the "creative intent" of the graphics and overlays Preferably, only a single Level 12 field should be specified in a bitstream. In the case that multiple fields are specified, only the last one is considered valid. The metadata values can change on a per-frame basis, which is necessary for tracking an ROI within a video sequence. The field is extensible, allowing additional fields to be added for future versions.

An example of software (e.g., pseudocode) that can implement an embodiment is provided below.

Intelligent Zoom: Adapting the Content to Playback Device
  Where:
    [TDisplay_w TDisplay_h]=Target Display width and height
    TargetAspectRatio=TDisplay_w/TDisplay_h
    [Im_w Im_h]=source image width and height
    [Sw Sh]=ROI width and height
    [$S_{TBLR}$]=ROI top, bottom, left, and right pixels
    [Rw Rh]=reshaped ROI width and height
  1. Reshape the ROI to match the target display aspect ratio
  if Sw>=Sh
    Rw=Sw
    Rh=Rw/TargetAspectRatio
  if Sw<Sh
    Rh=Sh
    Rw=Sh*TargetAspectRatio
  2. Create an oversized source image canvas, matching target display aspect ratio
  if Im_w>Im_h
    if TDisplay_w>TDisplay_h
      H=Im_h
      W=H*TargetAspectRatio
    if TDisplay_w<TDisplay_h
      H=Im_w
      W=W/TargetAspectRatio
  if Im_w<Im_h
    if TDisplay_w>TDisplay_h
      H=Im_h
      W=H*TargetAspectRatio
    If TDisplay_w<TDisplay_h
      W=Im_w
      H=W/TargetAspectRatio
  overSizeSource=[H W]
  padSize=[H-Im_h-W-Im_w]
  3. Morph ROI to Reshaped ROI Size
  $Im_{TBLR}$=[1 1 Im_h Im_w]
  ROISizeDiff=[Rh-Sh-Rw-Sw]
  % Compute the Percentage of Pixels that are between the sides of the ROI and the source image bounds.
  topRoom=($S_T$-$Im_T$)/Im_h
  bottomRoom=($Im_B$-$S_B$)/Im_h
  leftRoom=($S_L$—$Im_L$)/Im_w
  rightRoom=($Im_R$-$S_R$)/Im_w
  if topRoom<bottomRoom
    % There are more pixels available beneath ROI
    topScalar=topRoom
    bottomScalar=1-topScalar
  otherwise
    % There are more pixels available above ROI
    bottomScalar=bottomRoom
    topScalar=1-bottomScalar
  if leftRoom<rightRoom
    % There are more pixels available to the left of the ROI
    leftScalar=leftRoom
    rightScalar=1-leftScalar
  otherwise
    % There are more pixels available to the right of the ROI
    rightScalar=rightRoom
    leftScalar=1-rightScalar
  % Use ROISizeDiff & {tblr} Scalars to create the reshaped ROI coordinates
  $R_T$=$S_T$-(ROISizeDiff*topScalar)
  $R_B$=$S_B$ (ROISizeDiff*bottomScalar)
  $R_L$=$S_L$-(ROISizeDiff*leftScalar)
  $R_R$=$S_R$+(ROISizeDiff*rightScalar)
  % Translate these source-relative coordinates to oversized source coordinates (designated primed, or ')
  $R'_T$=$R_T$+(padSize_h/2)
  $R'_B$=$R_B$+(padSize_h/2)
  $R'_L$=$R_L$+(padSize_w/2)
  $R'_R$=$R_R$+(padSize_w/2)
  % Get zoomed ROI coordinates
  Left=$R'_L$-1
  Right=oversizedSource_w-$R'_R$
  Top=$R'_T$-1
  Bottom=oversizedSource_h-$R'_B$
  $RS_{TBLR}$=[Top Bottom Left Right] *zoomFactor
  (see section below for calculation of zoomFactor)
  % Generate rescaled image
  $outputROI_{TL}$=$R'_{TL}$-$RS_{TL}$
  $outputROI_{BR}$=$R'_{BR}$+$RS_{BR}$
  % Calculating zoomFactor
  This section describes an example of how to calculate a zoom factor and is used in the software example provided above.
  Default TDisplayDiagonal and ViewerDistance may be given as parameters in a configuration file (e.g., in inches)
  % Calculate the display diagonal in pixels
  Tdisplay_diagonalInPixels=hypotenuse(TDisplay_h, TDisplay_w)
  % Calculate the pixels per inch
  pixels_per_inch=TDisplay_diagonalInPixels/TDisplayDiagonal
  % Calculate the display height (inches)
  TDisplay_heightInInches=TDisplay_h/pixels_per_inch
  % Translate the viewer distance from inches to picture heights
  Viewer_distance_PH=viewerDistance/TDisplay_heightInInches
  % Zoom factor compares the mastering distance to the actual viewer distance
  zoomFactor=Mastering_Distance_PH/Viewer_Distance_PH An alternative embodiment of playback behavior is also provided in the Appendix.

Display Adaptation Based on the Relative Position of an Observer to the Display When viewing a scene through a window, the appearance of the scene differs depending on the relative position of the observer to the window. For example, one views a greater extent of the outside scene when one is closer to the window than further away from it. Similarly, as a viewer moves laterally, some parts of the image are revealed on one side of the window while others are occluded at the other side of the window.

If the window is replaced with a lens (magnifying or reducing), the outside scene would now appear either larger (zoomed in) or smaller (zoomed out) compared to the real scene, but it would still provide the observer with the same experience as when they move in relation to the window.

In contrast, when an observer views a digital image reproduced on a conventional display, the image does not change according to the relative position of the viewer to the display. In an embodiment, this disparity between the experience of viewing through a window compared to viewing a conventional display is addressed by adapting images on a display according to the relative position of the observer to the display, thus enabling them to view the rendered scene as if observing it through a window. Such embodiments allow content creators (e.g., a photographer, a mobile user, or cinematographer) to better convey or share with their audience the experience of being in a real scene.

In an embodiment, an example process for image display adaptation according to the relative position of an observer to the display may include the following steps:

Obtaining an image with a capturing device, like a camera, or loading from disk

Specifying on the captured image a region of interest (ROI)

Transmitting the image and ROI metadata to a receiving device

On the receiving device, determining the location of the viewer with respect to the display Displaying the image on the display according to the ROI metadata, the aspect ratio of the screen, and the relative location of the viewer to the screen Each of these steps are described in more detail, as follows.

Without limitation, as an example, an image may be obtained using a camera, or by loading it from disk or memory, or by capturing it from a decoded video. The process may be applied to a single picture or frame or a sequence of pictures or frames.

The region of interest is a region within the image and typically corresponds to the most important part of the image that should be preserved across a wide range of display and viewing configurations. A region of interest, e.g., a rectangle region of the image, may be defined manually or interactively, e.g., by allowing a user to draw a rectangle on the image using his finger, a mouse, a pointer, or some other user interface. In some embodiments, an ROI may be generated automatically by identifying specific objects in the image (e.g., faces, cars, license plates, etc.). An ROI could also be tracked automatically across multiple frames of a video sequence.

There are many ways to estimate the distance and relative position of the viewer relative to the screen. The following methods are provided only as examples and without limitation. In an embodiment, viewer position can be established using an imaging device near to or integrated into the bezel of the display, such as an internal camera or an external webcam. The image from the camera may be analyzed to locate human heads in the image. This is done using conventional image processing techniques commonly used for "face detection," camera autofocus, auto-exposure, or image annotation, and the like. There is sufficient literature and techniques for implementing face detection for a user skilled in the art to isolate the location of the observer's head in an image. The return value of the face detection process is a rectangular bounding box of the viewer head, or a single point corresponding to the center of the bounding box. In embodiments, the location of the viewer can be further improved by any of the following techniques:

a) Temporal filtering. This type of filtering can reduce measurement noise in the estimated head position, thus providing a smoother and more continuous experience. An IIR filter can reduce noise, but the filtered position lags behind the actual position Kalman filtering is intended to both reduce noise and predict the actual position based on some number of previous measurements. Both of these techniques are well known in the art.

b) Eye position tracking. Once the head position has been identified, it is possible to further improve the estimated position of the viewer by finding the location of their eyes. This may involve further image processing, and the step of finding the head may be skipped entirely. The location of the viewer can then be updated to indicate the position directly in the center of the two eyes, or alternately the position of a single eye.

c) Faster update measurements. Faster (more frequent) measurements are desirable to obtain the most accurate current position of the viewer.

d) Depth cameras. To improve the estimate of the viewer distance from the camera, special cameras that directly measure the distance may be employed. Such examples are time-of-flight, stereoscopic cameras, or structured light. Each of these in known in the art and are commonly used for estimating the distance of objects in the scene to the camera.

e) Infra-red cameras. To improve the performance over a wide range of environment lighting (i.e., a dark room), infrared cameras may be used. These may measure the heat of the face directly, or measure reflected IR light from an IR transmitter. Such devices are commonly used in security applications.

f) Distance calibration. The distance between the viewer and the camera may be estimated by the image processing algorithms. This can then be calibrated to a distance from the screen to the viewer, using a known displacement between the camera and the screen. This ensures that the displayed image is correct for the estimated viewer position.

g) gyroscopes. They are widely available in mobile devices and they can easily provide information of the orientation of the display (say, portrait vs landscape mode) or the relative movement of a hand-held display compared to the observer.

It has already been described earlier herein how given the ROI metadata and the characteristics (aspect ratio) of the screen, the rendered image may be adapted according to the region of interest and the assumed position of a viewer. In an embodiment, if the assumed position of the observer is replaced with their estimated position, as computed by any of the techniques discussed earlier, then the display rendering may be adjusted using one or more of the following techniques, with examples depicted in FIGS. 6A to 6G.

Figure 6A:
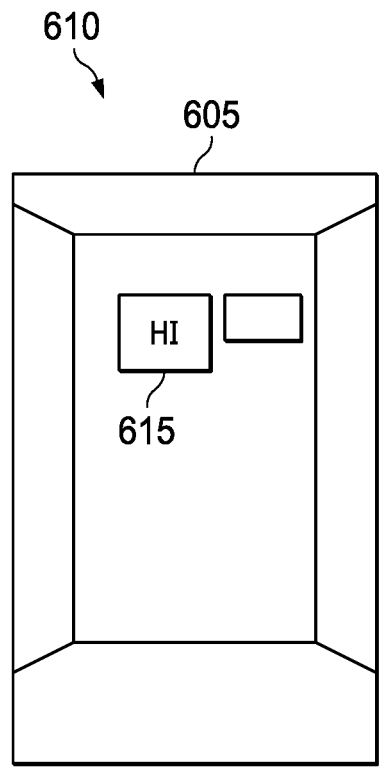
FIGS. 6A, 6B, 6C, 6D, 6E, 6F, and 6G depict examples of how a playback device can display an image based on image metadata and the relative position of the display with an observer.

As an example, FIG. 6A depicts an image 610 as originally captured and displayed on display 605 (e.g., a mobile phone or a tablet in portrait mode) without taking into consideration the ROI metadata. As an example, rectangle 615 ("Hi") may represent a region of interest (e.g., a picture frame, a banner, a face, and the like).

Figure 6B:
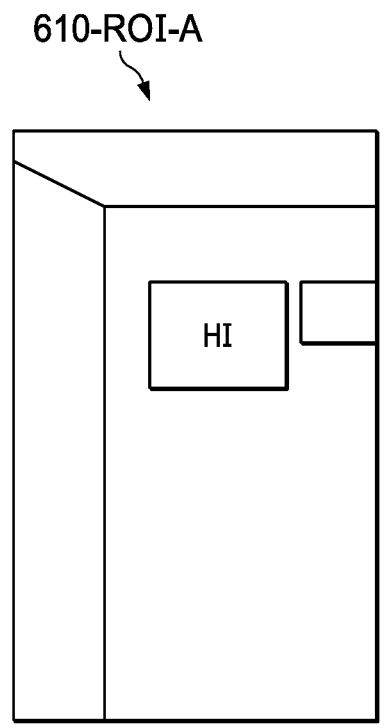

FIG. 6B depicts an example of rendering the image 610 by considering a reference viewing position (e.g., 3.2 picture heights, centered horizontally and vertically on the screen), with appropriate scaling to enlarge the ROI (615) while maintaining the original aspect ratio.

Figure 6C:
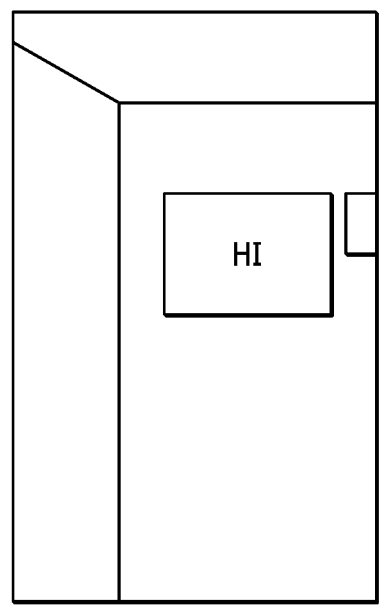
Figure 6D:
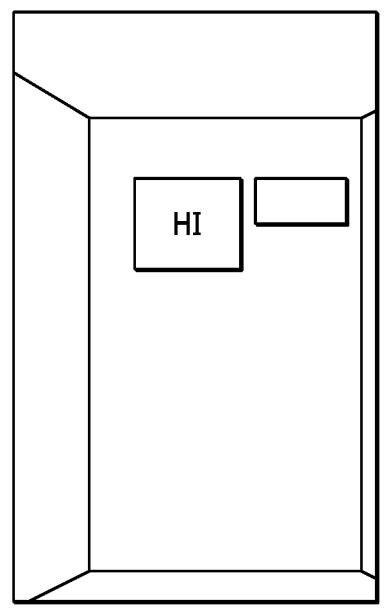

In an embodiment, as depicted in FIG. 6C, as the viewer moves away from the screen, or the display is moved further away from the viewer, the image is further zoomed in, representing the same effect as if the viewer had moved away from the window, thus limiting his view of the outside scene. Similarly, as depicted in FIG. 6D, as the viewer moves closer to the screen, or the display is moved closer to the viewer, the image is further zoomed out, representing the same effect as if the viewer had moved closer to the window, thus enlarging his view of the outside scene.

Figure 6E:
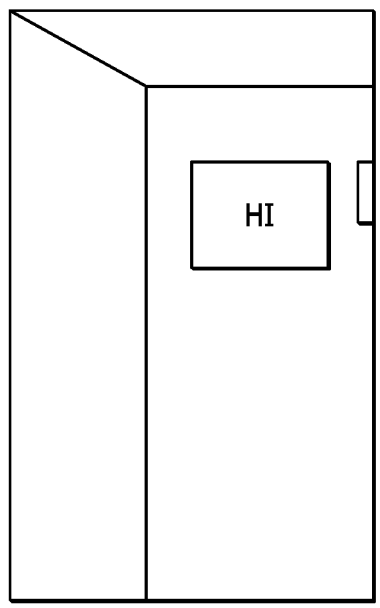
Figure 6F:
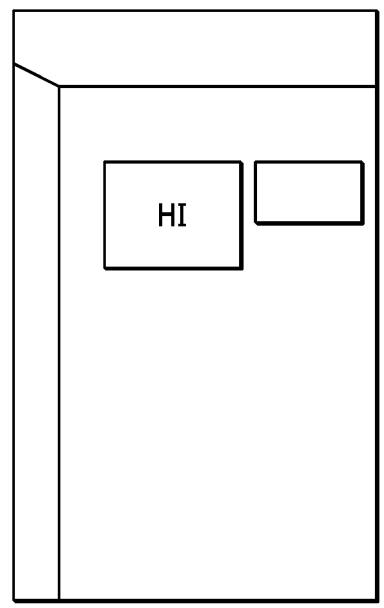

In an embodiment, as depicted in FIG. 6E, as the viewer moves to the right of the display, or the display is moved to the left of the viewer, the image is shifted to the right, representing the same effect as if the viewer looked out of the window to the left. Similarly, as depicted in FIG. 6F, as the viewer moves to the left of the display, or the display is moved to the right of the viewer, the image is shifted to the left, representing the same effect as if the viewer looked out of the window to the right.

Similar adjustments may also be made when the viewer (or the display) moves up and down or in a combination of movements. In general, the image is moved by an amount based on the assumed or estimated depth of the scene in the image. With a very shallow depth, the movement is smaller than the actual movement of the viewer, and with very large depths, the movement may be equal to the movement of the viewer.

Figure 6G:
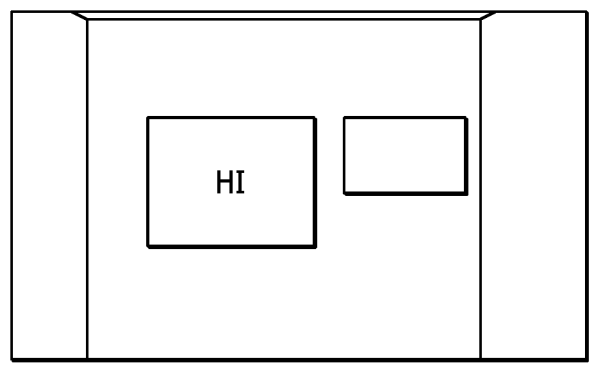

In an embodiment, all of the above operations may be adjusted according to the aspect ratio of the display. For example, in landscape mode, as depicted in FIG. 6G, the original image (610) is scaled and cropped so that the ROI 615 is centered in the field of view of the observer. The displayed image (610-ROI-B) can then be further adjusted according to the relative position of the observer to the screen as described earlier.

In an embodiment, as the ROI approaches the edge of the image, it may be moved by an increasingly small amount, to prevent it from abruptly reaching the edge and not moving any more. Thus, from near the reference position (e.g., 610-ROI-A), the image may be adjusted in a natural way just as looking through a window, but when approaching the edge of the captured image the rate of movement may decrease. It is desirable to prevent an abrupt border between natural movement and no movement, instead it is preferred to smoothly scale the fraction of movement as the viewer moves towards the maximum allowable amount.

Optionally, the image can be slowly re-centered over time to the actual viewing position of the viewer, thus potentially allowing greater range of movement and motion from the actual viewing position. For example, if a viewer starts viewing from the reference position, then moves towards the bottom-left corner of the screen, the image may be adjusted to pan up and to the right. From this new viewing position, the viewer would have no further movement allowed towards the bottom-left direction. With this optional feature, over time the view may return to the center position, thus restoring a range of movement of the viewer in all directions. Optionally, the amount to shift and/or scale an image based on the viewer position may be partially determined by additional distance metadata, which describes the distance (depth) of the main subject comprising the ROI to the viewer. In order to emulate the experience of looking through a window, the image should be adapted less for closer distances than for farther distances.

In another embodiment, optionally, as described earlier, an overlay image may be composed with the adjusted image, where the position of the overlay image remains static. This prevents important information in the overlay image to remain visible at all times and from all viewing positions. Furthermore, it enhances the sense of immersion and realism of the experience, just as a semi-transparent overlay printed on a window.

In another embodiment, optionally, as described earlier, the color volume mapping may be adjusted according to the actual region of the image that is displayed. For example, if the viewer moves to the right to better see a bright object in the scene, the metadata describing the dynamic range of the image may be adjusted to reflect the brighter image, and thus the tone mapping may cause the rendered image to be mapped slightly darker, thus mimicking the effect of adaptation that a human observer would experience when looking through a window at a scene.

With reference to the pseudocode described earlier for "Intelligent Zoom" (for a fixed distance between the observer and the screen), in an embodiment, the following changes are needed to allow Intelligent zoom with viewer-position adaptation:

a) Instead of using a hypothetical reference viewing distance, use the actual distance (as measured by any of the known techniques) from the viewer to the screen to compute the "viewerDistance" and "zoomFactor" parameters described earlier and generate a scaled image.

b) Shift the scaled image across the (x,y) coordinates according to the viewer's position across the screen. As an example, and without limitation, the viewer's position may be computed with reference to the (x,y) coordinates of their eyes. In pseudocode, this can be expressed as:

```
% Query for eye positions or position of face in general
eye_left_xy₀ // initial left eye position (origin point)
eye_right_xy₀ // initial right eye position (origin point)
eye_left_xyᵢ // new left eye position
eye_right_xyᵢ // new right eye position
% Calculate the difference in eye position
% Im_d dictates how much to shift the resulting image.
% It is inclusive in [0,1]. Im_d = 0 results in
% no shift (feature is off)
delta_left_xy = - (eye_left_xyᵢ + eye_left_xy₀ ) * Im_d
delta_right_xy = - (eye_right_xyᵢ + eye_right_xy₀ ) * Im_d
% Average the difference
offset_x = (delta_left_x + delta_right_x) / 2
offset_y = (delta_left_y + delta_right_y) / 2
% Apply shift to scaled/zoomed image (e.g., the one computed using zoomFactor)
outputROI_L = outputROI_L - offset_x - (max(0, outputROI_R - offset_x - Im_w));
outputROI_R = outputROI_R - offset_x + (max(0, -outputROI_L));
outputROI_T = outputROI_T - offset_y - (max(0, outputROI_B - offset_y - Im_h));
outputROI_B = outputROI_B - offset_y + (max(0, -outputROI_T));
```

Figure 7:
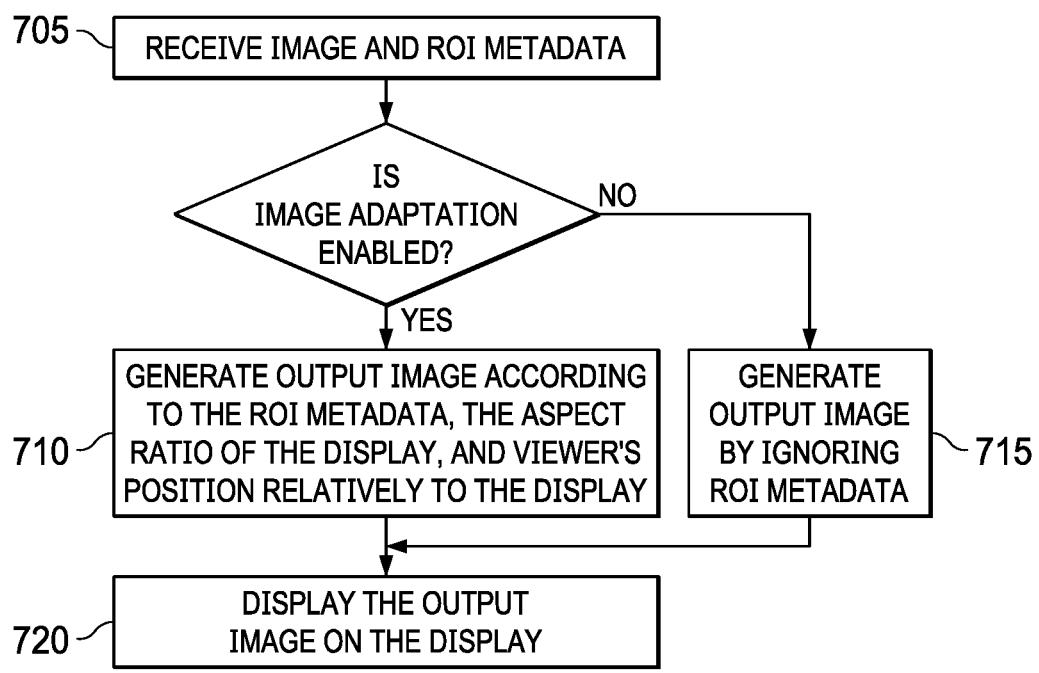
FIG. 7 shows an example of displaying images according to an embodiment of image adaptation processing.

FIG. 7 depicts an example process flow for displaying images using a display adaptation process according to an embodiment. In step 705, a device receives an input image and parameters related to a region of interest within the image. If image adaptation (e.g., "Intelligent Zoom" as described herein) is not enabled, then, in step 715, the device generates an output image without any consideration of the ROI metadata. However, if image adaptation is enabled, then, in step 710, the device may use the ROI metadata and the display parameters (e.g., the aspect ratio) to generate an output version of the input image to emphasize the ROI of the input image. Furthermore, in some embodiments, the device may further adjust the output image according to the relative position and distance of the viewer to the display. The output image is displayed in step 720.

Figure 8:
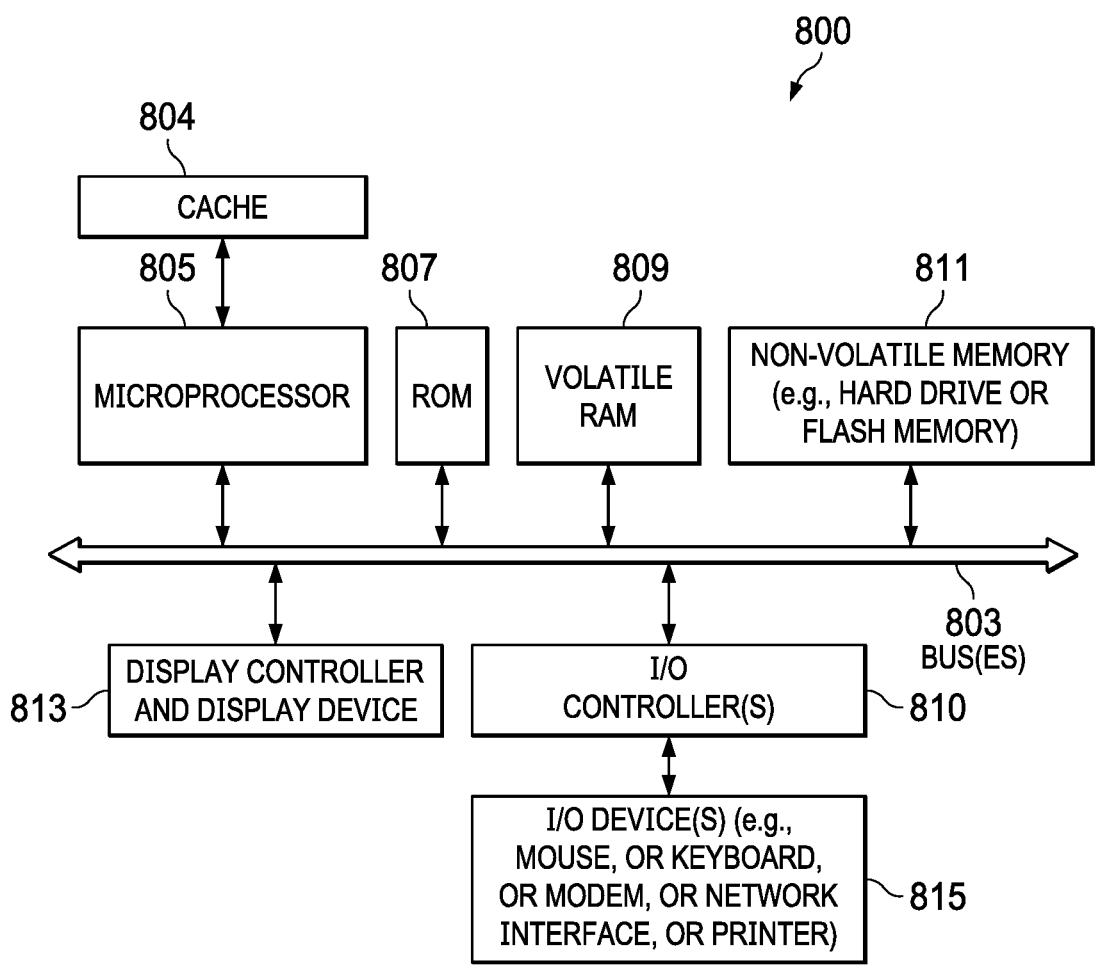
FIG. 8 shows an example of a data processing system that can be used to create content and metadata as described herein. It also shows an example of a data processing system that can be a playback device that uses the metadata to adapt the playback based on the metadata and the aspect ratio of the playback device.

FIG. 8 shows one example of a data processing system 800, which may be used with one embodiment. For example, the system 800 may be implemented to provide a content creation or editing system that performs the method of FIG. 2A or FIG. 5 or a playback device that performs the method of FIG. 2B. Note that while FIG. 8 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 8, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 8 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

Various aspects of the present invention may be appreciated from the following enumerated example embodiments (EEEs):

EEE1. A machine implemented method, the method comprising:
selecting an original aspect ratio (AR) for an image canvas for use in content creation; determining, within at least a first scene in content on the image canvas, a first position of a first subject in the at least first scene;
determining, based on a determined position of the first subject, first metadata that specifies how, relative to the first position, to adapt a playback on a display device having an AR that is different than the original AR; and
storing the first metadata, the first metadata and the content to be used, or transmitted for use, during playback.
EEE2. The method as in EEE 1, wherein the original AR is substantially square.
EEE3. The method as in EEE 2 wherein substantially square is one of either (1) more square than a 16:9 AR such that the ratio of the length to height for the original AR is less than the ratio of 16:9 (16/9) but greater than or equal to 1:1 or (2) more than the ratio of 9:16 but less than 1:1 when a portrait mode is preferred; and wherein the original AR varies during the content.
EEE4. The method as in any of EEEs 1 to 3, the method further comprising:
determining, for a plurality of scenes, a plurality of subjects, the plurality of scenes including the first scene and the plurality of subjects including the first subject;
determining for each of the subjects in the plurality of scenes a corresponding position within the corresponding scene.
EEE5. The method as in EEE 4, wherein subjects are determined on a scene by scene basis within the plurality of scenes; and wherein the method further comprises: displaying a preview of how different aspects ratios will crop based on the metadata.
EEE6. The method as in any of EEEs 1 to 5 wherein the first metadata guides asymmetric cropping on a playback device to expand from the first subject in the first scene for different ARs when adapting for playback.
EEE7. A non-transitory machine-readable medium storing executable program instructions which when executed by a data processing system cause the data processing system to perform a method as in any one of EEEs 1-6.
EEE8. A data processing system having a processing system and memory, the data processing system configured to perform a method as in any one of EEEs 1-6.
EEE9. A machine implemented method, the method comprising:
receiving content that comprises image data for at least a first scene and receiving first metadata that is associated with the first scene, the first metadata specifying how, relative to a first position of a first subject in the first scene, to adapt a playback on a display device having an aspect ratio (AR) that is different than an original aspect ratio, the first scene having been created on an image canvas that has the original aspect ratio; and adapting output to the aspect ratio of the display device based on the first metadata. EEE10. The method as in EEE 9 wherein the original AR is substantially square.
EEE11. The method as in EEE 10 wherein substantially square is more square than a 16:9 AR such that the ratio of the length to height for the original AR is less than the ratio of 16:9 (16/9) and wherein the original AR varies during the content.
EEE12a. The method as in any of EEEs 9 to 11 wherein the content includes a plurality of scenes, including the first scene, and each of the scenes in the plurality of scenes has a determined position for a subject of the corresponding scene, wherein subjects are determined on a scene by scene basis, and wherein adapting for different ARs is done on a scene basis and wherein tone mapping is done on a scene by scene or frame by frame basis for the display device based on a region of interest within each scene or frame, and wherein each scene includes one or more frames.
EEE12b. The method as in any of EEEs 9 to 11 wherein the content includes a plurality of scenes, including the first scene, and each of the scenes in the plurality of scenes has a determined position for a subject of the corresponding scene, wherein subjects are determined on a scene by scene basis, and wherein adapting for different ARs is done on a scene basis and wherein tone mapping is done on a scene by scene or frame by frame basis for the display device based on what relative portion of an adapted image is labeled as a region of interest, and wherein each scene includes one or more frames.
EEE13. The method as in any of EEE 9 to 12, wherein the first metadata guides asymmetric cropping on a playback device to expand from the first subject in the first scene for different ARs when adapting for playback.
EEE14. The method as in EEE 9, further comprising:
receiving distance and position parameters related to a position of a viewer relative to the display device; and
further adapting the output of the first subject to the display device based on the distance and position parameters.
EEE15. The method as in EEE 14, wherein further adapting the output of the first subject to the display device comprises up-scaling the output of the first subject when a viewing distance between the viewer and the display device increases and down-scaling the output of the first subject when the viewing distance between the viewer and the display device decreases.

EEE16. The method as in EEE 14, wherein further adapting the output of the first subject to the display device comprises shifting the output of the first subject to the left when the display device moves to the right relatively to the viewer and shifting the output of the first subject to the right when the display device moves to the left relatively to the viewer.

EEE17. The method as in any of EEEs 9-16, further comprising:
  receiving graphics data; and
  generating a video output comprising a composite of the graphics data and the adapted output.

EEE18. The method of any of EEEs 9-17, wherein the first metadata further comprise syntax elements for defining an intended viewer motion path to guide Ken Burns-related effects during playback.

EEE19. A non-transitory machine-readable medium storing executable program instructions which when executed by a data processing system cause the data processing system to perform a method as in any one of EEEs 9-18.

EEE20. A data processing system having a processing system and memory, the data processing system configured to perform a method as in any one of EEEs 9-18.

APPENDIX

Example Playback Behavior

The playback device is responsible for applying the specified reframing, depending on image metadata, display configuration, and optional user configuration. In an example embodiment, the steps are as follows:

1) Specify a relative viewing distance, as a fraction of the "default viewing distance."
   Depending on the complexity or version of the implementation, options include:
      Use the default value of Relative ViewingDistance=1.0.
      Adjust it dynamically in one of two ways:
         Automatically, when resizing a window or entering picture in picture mode:

Relative ViewingDistance=sqrt(WindowWidth$^2$+WindowHeight$^2$)/sqrt(DisplayWidth$^2$+DisplayHeight$^2$)

Manually, via user interaction (pinching, scrolling, sliding a bar, and the like)
         Measuring the viewer distance using a camera or other sensor, and dividing the measured distance of the viewer (typically in meters) to the default viewing distance specified in a configuration file:

Relative ViewingDistance=ViewerDistance/DefaultViewingDistance

Note: In some embodiments, the value of the relative viewing distance may need to be bounded in a specific range (e.g., between 0.5 and 2.0). Two example bounding schemes are provided later in this section.

2) Convert the relative viewing distance of the source to relative angles $$U_{src} = \frac{W_{src}}{\min(W_{src}, H_{src}) \times MasterViewingDistance}$$

$$V_{src} = \frac{H_{src}}{\min(W_{src}, H_{src}) \times MasterViewingDistance}$$

where
      $(W,H)_{src}$ is the width and height of the source image in pixels, and MasteringViewingDistance is a value provided by L12 or other metadata, with a default value of 0.5

3) Convert the relative viewing distance of the target to relative angles $$U_{tgt} = \frac{W_{tgt}}{\min(W_{tgt}, H_{tgt}) \times RelativeViewingDistance}$$

$$V_{tgt} = \frac{H_{tgt}}{\min(W_{tgt}, H_{src}) \times RelativeViewingDistance}$$

where
      $(W,H)_{tgt}$ is the width and height of the target image in pixels, and RelativeViewingDistance is calculated from step (1)

4) Calculate the viewing angle of the Region of Interest $(U,V)_{roi}$ $U_{roi} = U_{src} \times W_{roi}/W_{src}$ $V_{roi} = V_{src} \times H_{roi}/H_{src}$ where
      $(W,H)_{roi}$ is the width and height of the ROI in pixels, provided by L12 or other metadata, with a default value of $(W,H)_{src}$, and $(W,H)_{src}$ is the width and height of the source image in pixels 5) Rescale the target viewing angle to ensure that the full ROI will be displayed $S_1 = \max(1, U_{roi}/U_{tgt}, V_{roi}/V_{tgt})$ 6) Rescale the target viewing angle to ensure that padding is only applied in one direction $S_2 = S_1 \times \min(1, \max(U_{src}/(U_{tgt} \times S_1), V_{src}/(V_{tgt} \times S_1)))$ $U_{tgt} = U_{tgt} \times S_1$ $V_{tgt} = V_{tgt} \times S_2$ 7) Find the angular coordinate of the top-left pixel of the ROI $(U, V)_0$:

$U_0 = U_{src} \times X_0/(W_{src}-1)$ $V_0 = V_{src} \times Y_0/(H_{src}-1)$ where
      $(X,Y)_0$ are the top-left positions of the ROI, from 0 to $(W,H)_{src}$, provided by L12 or other metadata, with a default value of $(0,0)$, and $(WH)_{src}$ are the width and height of the source image.

8) Scale the top-left angular position of the ROI based on distance to the edge, and centering the letterbox region when the target viewing angle is larger than the source viewing angle $$U_0 = \begin{cases} \frac{(U_{src} - U_{tgt})}{(U_{src} - U_{roi})} \times U_0 & U_{src} > U_{tgt} \\ \frac{(U_{src} - U_{tgt})}{2} & \text{otherwise} \end{cases}$$

-continued $$V_0 = \begin{cases} \frac{(V_{src} - V_{tgt})}{(V_{src} - V_{roi})} \times V_0 & V_{src} > V_{tgt} \\ \frac{(V_{src} - V_{tgt})}{2} & \text{otherwise} \end{cases}$$

9) Convert the angular coordinates to pixel coordinates $$X = \frac{U_0 \times (W_{src} - 1)}{U_{src}}$$

$$Y = \frac{V_0 \times (H_{src} - 1)}{V_{src}}$$

$$W = \frac{U_{tgt} \times W_{src}}{U_{src}}$$

$$H = \frac{V_{tgt} \times H_{src}}{V_{src}}$$

10) Rescale the ROI (X, Y, W, H) calculated in the previous step to the output image resolution. Note: this can be done either before or after applying the tone mapping.

11) Calculate the adjustment to the tone mapping based on the relative size of the ROI to the source image $$S_{mid} = L1_{mid} + L3_{midoffset} + \left(1 - \frac{W \times H}{W_{src} \times H_{src}}\right) \times L12_{midoffset}$$

where $S_{mid}$ is the values used as the mid-point of the tone curve for tone mapping $L1_{mid}$ and $L3_{midoffset}$ are provided by L1 and L3 metadata $L12_{midoffset}$ is provided L12 metadata with a default value of 0.0

Constraining the range of RelativeViewingDistance

For certain embodiments, two options are provided to constrain the RelativeViewingDistance from a potentially infinite range to a valid range (e.g., between 0.5 to 2.0).

Hard Bounded. The viewing distance is hard bounded (clipped) between the minimum and the maximum viewing distances, with the size of the ROI preserved between the entire range. This method ensures an optimal mapping at all viewing distances but exhibits a sudden change of behavior at the minimum and maximum viewing distances.

Soft Bounded. In order to prevent sudden changes of behavior at the minimum and the maximum viewing distances while also extending the range of viewing distances, a sigmoidal function is applied to the viewing distance. This function has a few key properties:

a) 1:1 mapping at the default viewing distance, to provide a realistic and immersive response b) Slope of 0 at the minimum and maximum viewing distance, to prevent sudden changes in behavior As an example, the function curve illustrated below maps a slightly larger measured viewing distance from 0.25× to 2.5× the default viewing distance into a mapped viewing distance with a range of 0.5× to 2× the default viewing distance.

$$y = \begin{cases} -\frac{1}{4}\left(\frac{x - 0.25}{0.75}\right)^3 + \frac{3}{4}\left(\frac{x - 0.25}{0.75}\right)^2 + \frac{1}{2} & 0.25 \leq x \leq 1 \\ -\frac{1}{2}\left(\frac{x-1}{1.5}\right)^3 + \frac{3}{2}\left(\frac{x-1}{1.5}\right) + 1 & 1 < x \leq 2.5 \end{cases}$$

What is claimed is:

1. A machine implemented method, the method comprising:
receiving content that comprises image data for at least a first scene and receiving first metadata that is associated with the first scene, the first metadata specifying how, relative to a first position of a first subject in the first scene, to adapt a playback on a display device having an aspect ratio (AR) that is different than an original aspect ratio, the first scene having been created on an image canvas that has the original aspect ratio; and
adapting output to the aspect ratio of the display device based on the first metadata; further comprising:
receiving distance and position parameters related to a position of a viewer relative to the display device; and
further adapting the output of the first subject to the display device based on the distance and position parameters; and
wherein the content includes a plurality of scenes, including the first scene, and each of the scenes in the plurality of scenes has a determined position for a subject of the corresponding scene, wherein subjects are determined on a scene by scene basis, and wherein adapting for different ARs is done on a scene basis and wherein tone mapping is done on a scene by scene or frame by frame basis for the display device based on what relative portion of an adapted image is labeled as a region of interest, wherein the region of interest includes the first subject, and wherein each scene includes one or more frames.

2. The method as in claim 1 wherein the original AR is substantially square.

3. The method as in claim 2 wherein substantially square is more square than a 16:9 AR such that the ratio of the length to height for the original AR is less than the ratio of 16:9 (16/9) and wherein the original AR varies during the content.

4. The method as in claim 1, wherein the first metadata guides asymmetric cropping on a playback device to expand from the first subject in the first scene for different ARs when adapting for playback.

5. The method as in claim 1, wherein further adapting the output of the first subject to the display device comprises up-scaling the output of the first subject when a viewing distance between the viewer and the display device increases and down-scaling the output of the first subject when the viewing distance between the viewer and the display device decreases.

6. The method as in claim 1, wherein further adapting the output of the first subject to the display device comprises shifting the output of the first subject to the left when the display device moves to the right relatively to the viewer and shifting the output of the first subject to the right when the display device moves to the left relatively to the viewer.

7. The method of claim 1, further comprising:
receiving graphics data; and
generating a video output comprising a composite of the graphics data and the adapted output.

8. The method of claim 1, wherein the first metadata further comprise syntax elements for defining an intended viewer motion path to guide Ken Burns-related effects during playback.

9. A non-transitory machine-readable medium storing executable program instructions which when executed by a data processing system cause the data processing system to perform a method as in claim 1.

10. A data processing system having a processing system and memory, the data processing system configured to perform a method as in claim 1.

11. A machine implemented method, the method comprising:
- selecting an original aspect ratio (AR) for an image canvas for use in content creation;
- determining, within at least a first scene in content on the image canvas, a first position of a first subject in the at least first scene;
- determining, based on a determined position of the first subject and based on a distance between a viewer and a display device, first metadata that specifies how, relative to the first position, to adapt a playback on the display device having an AR that is different than the original AR; and wherein the content includes a plurality of scenes, including the first scene, and each of the scenes in the plurality of scenes has a determined position for a subject of the corresponding scene, wherein subjects are determined on a scene by scene basis, and wherein adapting for different ARs is adapted to be done on a scene basis and wherein tone mapping is adapted to be done on a scene by scene or frame by frame basis for the display device based on what relative portion of an adapted image is labeled as a region of interest, wherein the region of interest includes the first subject, and wherein each scene includes one or more frames; and
- storing the first metadata, wherein the first metadata and the content are to be used, or are to be transmitted for use, during playback.

12. The method as in claim 11, wherein different zoom factors for displaying the first subject are provided for different distances between the viewer and the display device.

13. The method as in claim 11, wherein the original AR is substantially square.

14. The method as in claim 13 wherein substantially square is one of either (1) more square than a 16:9 AR such that the ratio of the length to height for the original AR is less than the ratio of 16:9 (16/9) but greater than or equal to 1:1 or (2) more than the ratio of 9:16 but less than 1:1 when a portrait mode is preferred; and wherein the original AR varies during the content.

15. The method as in claim 11, the method further comprising:
- determining, for a plurality of scenes, a plurality of subjects, the plurality of scenes including the first scene and the plurality of subjects including the first subject; and
- determining for each of the subjects in the plurality of scenes a corresponding position within the corresponding scene.

16. The method as in claim 15, wherein subjects are determined on a scene by scene basis within the plurality of scenes; and wherein the method further comprises:
- displaying a preview of how different aspects ratios will crop based on the metadata.

17. The method as in claim 11 wherein the first metadata guides asymmetric cropping on a playback device to expand from the first subject in the first scene for different ARs when adapting for playback.

18. A non-transitory machine-readable medium storing executable program instructions which when executed by a data processing system cause the data processing system to perform a method as in claim 11.

19. A data processing system having a processing system and memory, the data processing system configured to perform a method as in claim 11.

* * * * *